(12) United States Patent
Kwag et al.

(10) Patent No.: US 9,224,996 B2
(45) Date of Patent: Dec. 29, 2015

(54) BATTERY PACK INCLUDING A PLURALITY OF UNIT CELLS WITH A CASE HAVING AN INSULATION STRUCTURE THAT ENGAGES WITH GUIDE PINS

(75) Inventors: Nohyun Kwag, Suwon-si (KR); Kyungwon Seo, Suwon-si (KR); Jeongdeok Byun, Suwon-si (KR); Wanseok Doh, Suwon-si (KR); Jinhong An, Suwon-si (KR); Jungyup Han, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 535 days.

(21) Appl. No.: 12/819,425

(22) Filed: Jun. 21, 2010

(65) Prior Publication Data

US 2011/0008667 A1    Jan. 13, 2011

(30) Foreign Application Priority Data

Jul. 9, 2009   (KR) ........................ 10-2009-0062733

(51) Int. Cl.
| | |
|---|---|
| *H01M 2/02* | (2006.01) |
| *H01M 2/10* | (2006.01) |
| *H01M 2/20* | (2006.01) |
| *H01M 10/42* | (2006.01) |
| *H01M 10/6556* | (2014.01) |
| *H01M 10/6557* | (2014.01) |
| *H01M 10/643* | (2014.01) |
| *H01M 10/613* | (2014.01) |
| *H01M 10/0525* | (2010.01) |

(52) U.S. Cl.
CPC ............ *H01M 2/1077* (2013.01); *H01M 2/105* (2013.01); *H01M 2/204* (2013.01); *H01M 10/4207* (2013.01); *H01M 10/613* (2015.04); *H01M 10/643* (2015.04); *H01M 10/6556* (2015.04); *H01M 10/6557* (2015.04); *H01M 10/0525* (2013.01)

(58) Field of Classification Search
None
See application file for complete search history.

(56) References Cited

U.S. PATENT DOCUMENTS

| | | | | |
|---|---|---|---|---|
| 3,884,725 | A | * | 5/1975 | Schmidt ........................ 429/65 |
| 6,211,646 | B1 | * | 4/2001 | Kouzu et al. .................. 320/107 |
| 6,240,637 | B1 | * | 6/2001 | Ikeda et al. .................... 29/854 |
| 6,255,014 | B1 | * | 7/2001 | Dougherty et al. ............ 429/82 |
| 6,445,582 | B1 | * | 9/2002 | Oda et al. ...................... 361/695 |
| 7,112,387 | B2 | * | 9/2006 | Kimoto et al. ................. 429/99 |
| 2002/0187390 | A1 | * | 12/2002 | Kimoto et al. ................. 429/82 |
| 2005/0079408 | A1 | | 4/2005 | Hirano |
| 2006/0178051 | A1 | * | 8/2006 | Hashida et al. ............... 439/627 |
| 2006/0246350 | A1 | * | 11/2006 | Takayama et al. ............ 429/178 |
| 2008/0124622 | A1 | * | 5/2008 | Hamada et al. ............... 429/149 |

(Continued)

FOREIGN PATENT DOCUMENTS

| | | |
|---|---|---|
| EP | 1450422 | 8/2004 |
| JP | 10-270006 | 10/1998 |

(Continued)

*Primary Examiner* — Ula C Ruddock
*Assistant Examiner* — Tony Chuo
(74) *Attorney, Agent, or Firm* — Knobbe Martens Olson & Bear LLP (57) ABSTRACT

A battery pack including a plurality of unit cells, the battery pack including: a plurality of unit cells, a case accommodating the plurality of unit cells, and a first insulation structure covering a first external surface of the case. A plurality of first guide pins project from the first external surface of the case. A plurality of first coupling holes into which the first guide pins are respectively inserted is formed in the first insulation structure.

17 Claims, 3 Drawing Sheets

(56) References Cited

U.S. PATENT DOCUMENTS

| | | | |
|---|---|---|---|
| 2008/0254356 A1 | 10/2008 | Liersch et al. | |
| 2010/0047676 A1 | 2/2010 | Park et al. | |
| 2010/0255355 A1 | 10/2010 | Park et al. | |
| 2011/0177373 A1* | 7/2011 | Pellenc | 429/120 |

FOREIGN PATENT DOCUMENTS

| | | | |
|---|---|---|---|
| JP | 2001-229982 | 8/2001 | |
| JP | 2003-162993 | 6/2003 | |
| JP | 2006-140023 | 1/2006 | |
| JP | 2008-91233 A | 4/2008 | |
| JP | 2008-166208 A | 7/2008 | |
| JP | 2009-70614 A | 4/2009 | |
| JP | 2010-504623 | 2/2010 | |
| KR | 2008-0013040 A | 2/2008 | |
| WO | WO 2007/033689 | 3/2007 | |
| WO | WO 2008/038916 | 3/2008 | |
| WO | WO 2009/063143 A1 * | 5/2009 | H01M 2/10 |

* cited by examiner

BATTERY PACK INCLUDING A PLURALITY OF UNIT CELLS WITH A CASE HAVING AN INSULATION STRUCTURE THAT ENGAGES WITH GUIDE PINS

CROSS-REFERENCE TO RELATED APPLICATION

This application claims priority to and the benefit of Korean Patent Application No. 10-2009-0062733 filed on Jul. 9, 2009 in the Korean Intellectual Property Office, the entire content of which is incorporated herein by reference.

BACKGROUND OF THE INVENTION

1. Field of the Invention

Aspects of the present invention relate to a battery pack, and more particularly, to a battery pack including a plurality of unit cells.

2. Description of the Related Art

Recently, portable electronic devices have become widespread with rapid developments in electronics, communications, and the computer industry. A rechargeable secondary battery is mainly used as the power source of a portable electronic device.

A secondary battery including a single unit cell may be used as the power source of a small electronic device such as a mobile telephone. However, in order to provide enough output and capacity, a battery pack type secondary battery, in which a plurality of unit cells are connected to each other serially or are connected to each other in parallel, is used for a medium-sized or large device such as a laptop computer, an electric power tool, and an electric bike.

SUMMARY OF THE INVENTION

Aspects of the present invention provide a battery pack having a high workability during assembly, and having improved stability.

According to an aspect of the present invention, there is provided a battery pack including: a plurality of unit cells; a case accommodating the unit cells; and a first insulation structure covering a first external surface of the case, wherein a plurality of first guide pins project from the first external surface of the case, and the first insulation structure has a plurality of first coupling holes into which the first guide pins are respectively inserted.

The case may include a first frame wall protruding from an edge of the first external surface, and the first insulation structure may have a shape corresponding to an internal region of the first frame wall, wherein the first insulation structure is lower than the first frame wall.

The battery pack may further include a first connection structure positioned between the first external surface and the first insulation structure to connect electrode terminals of the unit cells to each other, wherein the first connection structure has first insertion holes into which the first guide pins are inserted.

The first insulation structure may be attached to the first connection structure with an adhesive.

The first connection structure may be coupled to the electrode terminals of the unit cells by welding.

The first connection structure may include a plurality of first unit connection members, and the first insulation structure may include a plurality of first unit insulation members having a shape corresponding to a shape of the first unit connection members.

The first insulation structure may have at least one first opening hole.

The first insulation structure may include a cover covering tops of the first opening holes.

The case may have passages corresponding to the first opening holes and a plurality of support columns supporting the unit cells, wherein the passages are formed in the support columns.

The battery pack may further include a first connection structure positioned between the first external surface and the first insulation structure to connect electrode terminals of the unit cells to each other, wherein the first connection structure has first air vents corresponding to the first opening holes.

The first insulation structure may be a plate.

The first insulation structure may be an insulation tape.

The battery pack may further include a second insulation structure covering a second external surface, which is an opposite surface of a first external surface of the case and in which a plurality of second guide pins are formed, wherein the second insulation structure has a plurality of second coupling holes into which the second guide pins are inserted.

The battery pack may further include a second connection structure positioned between the second external surface and the second insulation structure to connect electrode terminals of the unit cells to each other, wherein the second connection structure has second insertion holes into which the second guide pins are inserted.

The second insulation structure may have at least one second opening hole.

The battery pack may further include a second connection structure positioned between the second external surface and the second insulation structure to connect the electrode terminals of the unit cells to each other, wherein the second connection structure has second air vents corresponding to the second opening holes.

According to another aspect of the present invention, there is provided a case of a battery pack to accommodate a plurality of unit cells, the case including: a first accommodating unit on a first side of the case to accommodate a first side of the plurality of unit cells, and having a plurality of first guide pins projecting from an external surface thereof; and a second accommodating unit on a second side of the case, opposite the first side in a height direction of the case, to accommodate a second side of the plurality of unit cells, opposite the first side of the plurality of unit cells, wherein the external surface of the first accommodating unit is covered by a first insulation structure of the battery pack, and the plurality of first guide pins are inserted through the first insulation structure.

According to still another aspect of the present invention, there is provided a case of a battery pack to accommodate a plurality of unit cells, the case including: a first accommodating unit on a first side of the case to accommodate a first side of the plurality of unit cells; and a first insulation structure covering a first external surface of the first accommodating unit, wherein a plurality of first guide pins project from the first external surface of the first accommodating unit, and the first insulation structure has a plurality of first coupling holes into which the first guide pins are respectively inserted.

According to yet another aspect of the present invention, there is provided a method of assembling a battery pack, the method including: accommodating a plurality of unit cells in a case of the battery pack; covering a first external surface of the case with a first insulation structure; and inserting a plurality of guide pins respectively through a plurality of first coupling holes of the first insulation structure, wherein the first guide pins project from the first external surface of the case.

According to aspects of the present invention, there is provided a battery pack having guide pins inserted into an insulating plate such that the insulating plate is coupled with the guide pin, and assembly work may be easily performed. In addition, according to aspects of the present invention, since air vents are formed to emit heat, stability against heat generated during charge and discharge is high.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
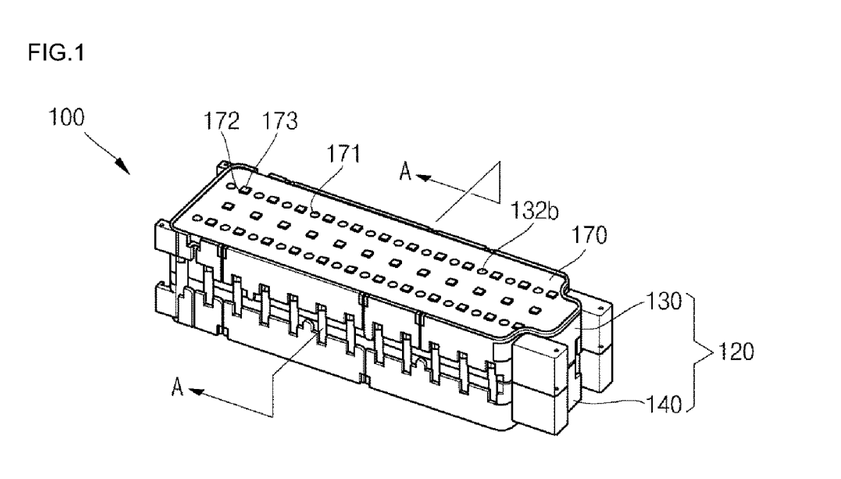
FIG. 1 is a perspective view illustrating a battery pack according to an embodiment of the present invention.
Figure 2:
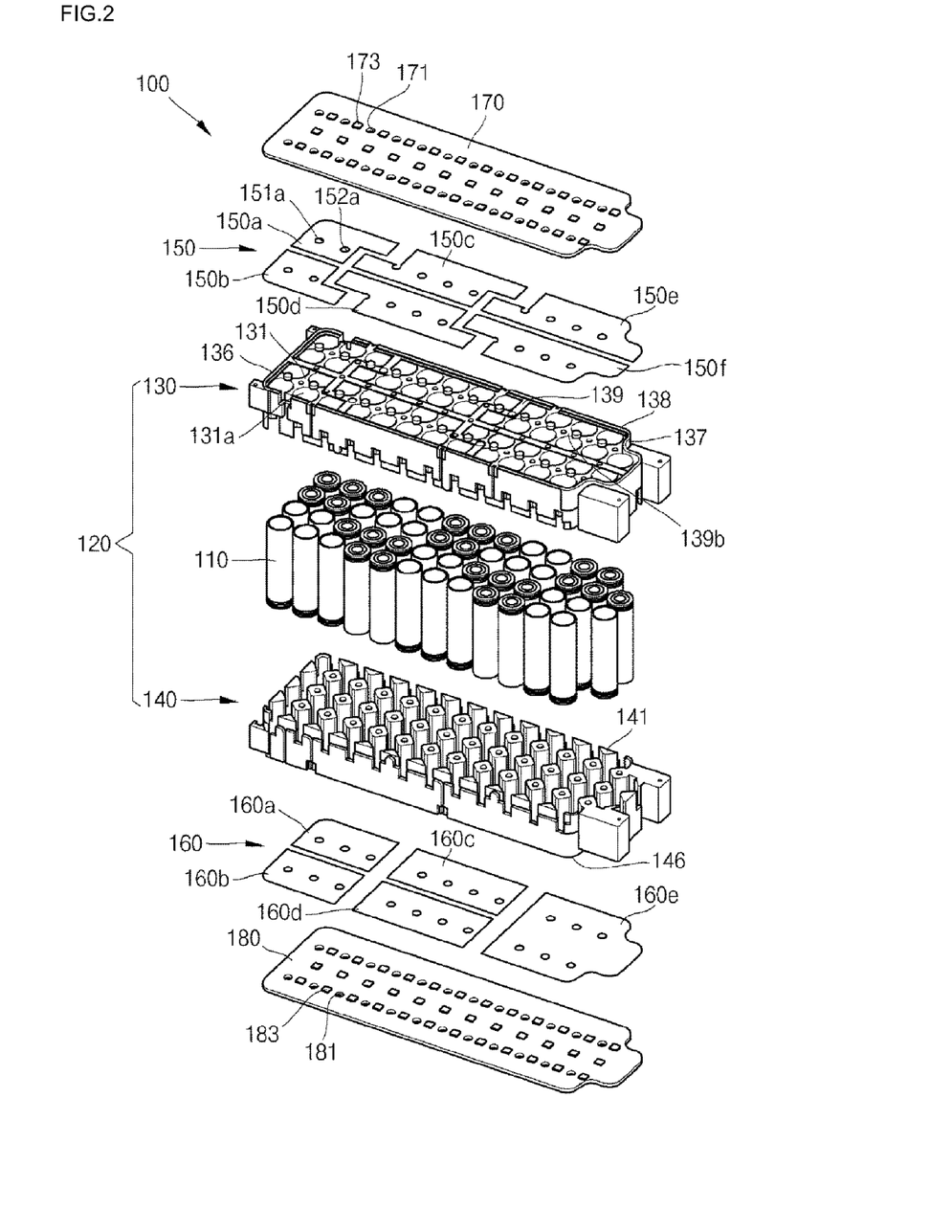
FIG. 2 is an exploded perspective view illustrating the battery pack of FIG. 1.
Figure 3:
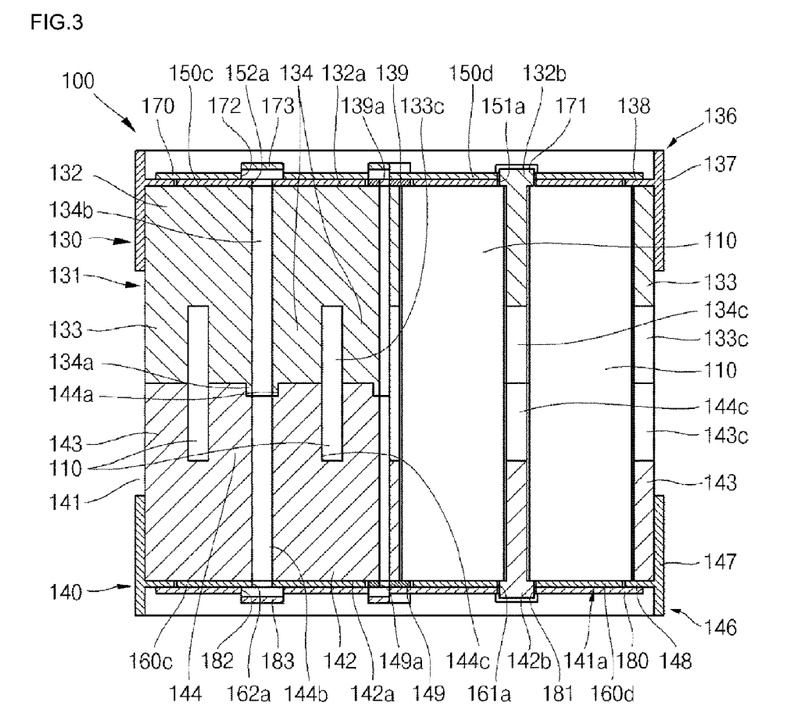
FIG. 3 is a side view illustrating an inside of the battery pack of FIG. 1, which is taken along a line A-A.

FIG. 1 is a perspective view illustrating a battery pack 100 according to an embodiment of the present invention. FIG. 2 is an exploded perspective view illustrating the battery pack 100 of FIG. 1. FIG. 3 is a side view illustrating an inside of the battery pack 100 of FIG. 1, which is taken along a line A-A. Referring to FIGS. 1 to 3, a battery pack 100 includes a plurality of unit cells 110, a case 120, a first connection structure 150, a second connection structure 160, a first insulation structure 170, and a second insulation structure 180.

The unit cells 110 are chargeable and dischargeable cylinder type batteries. That is, electric energy is stored in the unit cells 110 during the charge and the electric energy stored in the unit cells 110 is discharged during the discharge. In aspects of the present invention, the unit cell 110 may be described as a cylinder type lithium ion secondary battery having a common structure, in which an electrode assembly is accommodated in a cylindrical can. A positive electrode terminal and a negative electrode terminal are respectively formed at both ends of the unit cell 110. The unit cells 110 are accommodated in the case 120 and are arranged to be adjacent to each other and to be horizontally and vertically erect in parallel.

The case 120 includes a first accommodating unit 130 and a second accommodating unit 140. The case 120 stably accommodates the plurality of unit cells 110. In detail, the first accommodating unit 130 includes a first body 131 and a first cover 136. The first accommodating unit 130 accommodates the tops of the unit cells 110. The first body 131 includes a first base plate 132, a first side wall 133, and a plurality of first support columns 134. The first body 131 defines a space in which the tops of the unit cells 110 are accommodated.

The first base plate 132 is a planar plate with a plurality of first circular openings 131a to correspond to the unit cells 110. The positive electrode terminals or the negative electrode terminals provided on the tops of the unit cells 110 are exposed from the first body 131 through the first openings 131a. Furthermore, first guide pins 132b protrude from the first external surface 132a of the first base plate 132. The first guide pins 132b facilitate coupling between the first connection structure 150 and the first insulation structure 170. The first guide pins 132b partially screen the edges of the first openings 131a. Therefore, the first guide pins 132b prevent the unit cells 110 accommodated in the case 120 from being separated from the case 120 through the first openings 131a.

The first side wall 133 extends from the edge of the first base plate 132 to the opposite side of the first external surface 132a. A plurality of first external slits 133c is formed in the first side wall 133. The first external slits 133c correspond to the respective unit cells 110 positioned at the edge among the plurality of unit cells 110. The first external slits 133c expose the unit cells 110 positioned at the edge to an outside of the case 120 and emit heat from the unit cells 110. The inner surface of the first side wall 133 has a circular arc shape corresponding to the shape of the cylinder type unit cells 110.

The first support columns 134 extend from the first base plate 132 to the opposite side of the first external surface 132a. The first support columns 134 are positioned in spaces among the unit cells 110 to support the tops of the unit cells 110. Coupling protrusions 134a are formed at the ends of the first support columns 134. First passages 134b extend between the first external surface 132a and the coupling protrusions 134a in the first support columns 134. The first passages 134b emit heat from the battery pack 100. First internal slits 134c are formed among the first support columns 134 and between the first support columns 134 and the first side wall 133. The heat generated from the unit cells 110 may be easily emitted to the outside due to the first internal slits 134c. The four sides of each of the first support columns 134 have circular arc shapes to be matched with the shape of the four adjacent unit cells 110.

The first cover 136 includes a first frame wall 137, a first flange 138, and a first connection branch 139. The first cover 136 surrounds and protects the top of the first body 131. Specifically, the first frame wall 137 surrounds the sides of the first base plate 132 of the first body 131. An upper end of the first frame wall 137 protrudes above the first flange 138. Furthermore, the first flange 138 extends inwardly from the first frame wall 137, and contacts the edge of the first external surface 132a of the first body 131. The first flange 138 screens the first openings 131a that are positioned at the edge of the first body 131, from among the first openings 131a. Therefore, the first flange 138 prevents the unit cells 110, positioned at the edge of the case 120 from among the plurality of unit cells 110 accommodated in the case 120, from being separated from the case 120 through the first openings 131a.

The first connection branch 139 is in the form of a branch and is connected to the first flange 138 in a plurality of positions. The first connection branch 139 supports the first cover 136. Furthermore, the first connection branch 139 screens parts of the first openings 131a, thus preventing the unit cells 110 accommodated in the case 120 from being separated from the case 120 through the first openings 131a. A plurality of first through holes 139a is formed in the first connection branch 139, in positions corresponding to first air vents 152a formed in the first body 131. A plurality of first separated opening regions 139b is defined in the first cover 136 by the first connection branch 139. First unit connection members 150a, 150b, 150c, 150d, 150e, and 150f of the first connection structure 150, which will be described later, are positioned in each of the first opening regions 139b.

The second accommodating unit 140 includes a second body 141 and a second cover 146. The second accommodating unit 140 accommodates the bottoms of the unit cells 110. The second body 141 includes a second base plate 142, a second side wall 143, and a plurality of second support columns 144. The second body 141 defines a space in which the bottoms of the plurality of unit cells 110 are accommodated. The second base plate 142 is a planar plate that faces the first base plate 132. A plurality of second circular openings 141a is formed in the second base plate 142 to correspond to the plurality of unit cells 110. The positive electrode terminals 110a or the negative electrode terminals 110b provided on the bottoms of the unit cells 110 are exposed from the second body 141 through the plurality of second openings 141a.

Second guide pins 142b protrude from a second external surface 142a of the second base plate 142. The second guide pins 142b facilitate coupling between the second connection structure 160 and the second insulation structure 180. Moreover, the second guide pins 142b screen parts of the edges of the second openings 141a, thus preventing the unit cells 110 accommodated in the case 120 from being separated from the case 120 through the second openings 141a.

The second side wall 143 extends from the edge of the second base plate 142 to the opposite side of the second external surface 142a. The second side wall 143 is connected to the first side wall 133 of the first body 131, and forms the side wall of the case 120 with the first side wall 133. A plurality of second external slits 143c is provided in the second side wall 143. The second external slits 143c correspond to the unit cells 110 positioned at the edge among the unit cells 110, respectively. The second external slits 143c expose the unit cells 110 positioned at the edge to the outside of the case 120 and help the emission of heat from the unit cells 110. The second external slits 143c respectively correspond to the first external slits 133c to form the external slits of the case 120. The inner surface of the second side wall 143 has a circular arc shape to be matched with the shape of the cylinder type unit cells 110.

The second support columns 144 extend from the second base plate 142 to the opposite side of the second external surface 142a. The second support columns 144 are positioned in spaces among the unit cells 110 to support the bottoms of the unit cells 110. Coupling grooves 144a are formed at the ends of the second support columns 144. Accordingly, the coupling protrusions 134a formed in the first support columns 134 are inserted into the coupling grooves 144a, respectively. Therefore, the case 120 may be easily assembled and may be reinforced in structure by the coupling protrusions 134a and the coupling grooves 144a. The second support columns 144 form the support columns of the case 120 with the first support columns 134. Second passages 144b extend between the second external surface 142a and the coupling grooves 144a in the second support columns 144. The second passages 144b help emit heat from the battery pack 100. Furthermore, the second passages 144b respectively correspond to the first passages 134b to form the passages of the case 120. A plurality of second internal slits 144c are defined among the second support columns 144 and between the second support columns 144 and the second side wall 143. The heat generated from the unit cells 110 may be easily emitted to an outside of the battery pack 100 due to the second internal slits 144c. The second internal slits 144c respectively correspond to the first internal slits 134c to form the internal slits of the case 120. The four sides of the second support column 144 have circular arc shapes to be matched with the shape of the adjacent four unit cells 110.

The second cover 146 includes a second frame wall 147, a second flange 148, and a second connection branch 149. The second cover 146 surrounds and protects the bottom of the second body 141. The second frame wall 147 surrounds the sides of the second base plate 142 of the second body 141. The bottom of the second frame wall 147 protrudes below the second flange 148.

The second flange 148 extends inwardly from the second frame wall 147. The second flange 148 contacts the edge of the second external surface 142a of the second body 141. Moreover, the second flange 148 screens parts of the second openings 141a that are positioned at the edge of the second body 141 from among the second openings 141a. Therefore, the second flange 148 prevents the unit cells 110 that are positioned at the edge of the case 120, from among the plurality of unit cells 110 accommodated in the case 120, from being separated from the case 120 through the second openings 141a.

The second connection branch 149 has a branch form and is connected to the second flange 148 in one or more positions. The second connection branch 149 supports the second cover 146. Furthermore, the second connection branch 149 screens parts of the second openings 141a, thus preventing the unit cells 110 accommodated in the case 120 from being separated from the case 120 through the second openings 141a. A plurality of second through holes 149a are provided in the second connection branch 149 in positions corresponding to second air vents 162a formed in the second body 141. A plurality of second separated opening regions is defined in the second cover 146 by the second connection branch 149. Second unit connection members 160a, 160b, 160c, 160d, and 160e of the second connection structure 160, which will be described later, are positioned in each of the second opening regions.

The first connection structure 150 includes the first unit connection members 150a, 150b, 150c, 150d, 150e, and 150f, which are planar plates made of a conductive material. A first insertion hole 151a and the first air vent 152a are formed in each of the first unit connection members 150a, 150b, 150c, 150d, 150e, and 150f. The first guide pins 132b formed in the first body 131 are inserted into the first insertion holes 151a. At least two first insertion holes 151a may be formed in each of the first unit connection members 150a, 150b, 150c, 150d, 150e, and 150f such that the first unit connection members 150a, 150b, 150c, 150d, 150e, and 150f may be correctly positioned without movement. The first air vents 152a are positioned to correspond to the first passages 134b of the first body 131 to open the first passages 134b. The first unit connection members 150a, 150b, 150c, 150d, 150e, and 150f may be made of nickel, though it is understood that aspects of the present invention are not limited thereto. The first unit connection members 150a, 150b, 150c, 150d, 150e, and 150f are positioned to correspond to the first opening regions 139b formed in the first cover 136 and are connected to the terminals 110a and 110b of the unit cells 110 by welding or the like.

The second connection structure 160 includes the second unit connection members 160a, 160b, 160c, 160d, and 160e, which are planar plates made of a conductive material. A second insertion hole 161a and a second air vent 162a are formed in each of the second unit connection members 160a, 160b, 160c, 160d, and 160e. The second guide pins 142b formed in the second body 141 are inserted into the second insertion holes 161a. At least two second insertion holes 161a may be formed in each of the second unit connection members 160a, 160b, 160c, 160d, and 160e such that the second unit connection members 160a, 160b, 160c, 160d, and 160e may be correctly positioned without movement. The second air vents 162a are positioned to correspond to the second passages 144b of the second body 141 to open the second passages 144b. The second unit connection members 160a, 160b, 160c, 160d, and 160e may be made of nickel, though it is understood that aspects of the present invention are not limited thereto. The second unit connection members 160a, 160b, 160c, 160d, and 160e are positioned to correspond to the second opening regions formed in the second cover 146 and are connected to the terminals 110a and 110b of the unit cells 110 by welding or the like.

The first insulation structure 170 is made of an insulation material and is plate shaped. The first insulation structure 170 covers the first connection structure 150 and insulates the external surface of the battery pack 100. The first insulation structure 170 has a shape corresponding to an internal region of the first frame wall 137. The first insulation structure 170 is attached to the first connection structure 150, for example, by an adhesive or the like. A plurality of first coupling holes 171, a plurality of first opening holes 172, and a plurality of first covers 173 are provided in the first insulation structure 170.

The first guide pins 132b formed in the first body 131 are inserted into the first coupling holes 171 in a one-to-one correspondence. Therefore, the position of the first insulation structure 170 is correctly fixed so that assembly work is easily performed. The first opening holes 172 are positioned to correspond to the first passages 134b formed in the first body 131, thus opening the first passages 134b and the first air vents 152a formed in the first connection structure 150. The first covers 173 cover the first opening holes 172. Openings through which air may pass are formed on one or more sides of the first cover 173. The first covers 173 cover the first connection structure 150 exposed through the first opening holes 172 to increase an insulation effect and to prevent harmful materials from being introduced into the battery pack 100 through the first opening holes 172. The first covers 173 are lower than the first frame wall 137 of the first cover 136 to prevent the first covers 173 from being damaged.

The second insulation structure 180 is made of an insulation material and is plate shaped. The second insulation structure 180 covers the second connection structure 160 and insulates the external surface of the battery pack 100. The second insulation structure 180 is attached to the second connection structure 160, for example, by an adhesive or the like. A plurality of second coupling holes 181, a plurality of second opening holes 182, and a plurality of second covers 183 are provided in the second insulation structure 180.

The second guide pins 142b formed in the second body 141 are inserted into the second coupling holes 181 in a one-to-one correspondence. Therefore, the position of the second insulation structure 180 is correctly fixed so that assembly work is easily performed. The second opening holes 182 are positioned to correspond to the second passages 144b formed in the second body 141, thus opening the second air vents 162a formed in the second connection structure 160. The second covers 183 cover the second opening holes 182. Openings through which air may pass are formed on one or more sides of the second cover 183. The second covers 183 cover the second connection structure 160 exposed through the second opening holes 182 to increase an insulation effect and to prevent harmful materials from being introduced into the battery pack 100 through the second opening holes 182. The second covers 183 are lower than the second frame wall 147 of the second cover 146 to prevent the second covers 183 from being damaged.

While the first insulation structure 170 and the second insulation structure 180 are described above as plate shaped, it is understood that aspects of the present invention are not limited thereto. Furthermore, at least one of the two insulation structures 170 and 180 may be an insulation tape. When the insulation tape is used as the insulation structures, assembly work is easily performed since adhesive is not necessary.

Figure 4:
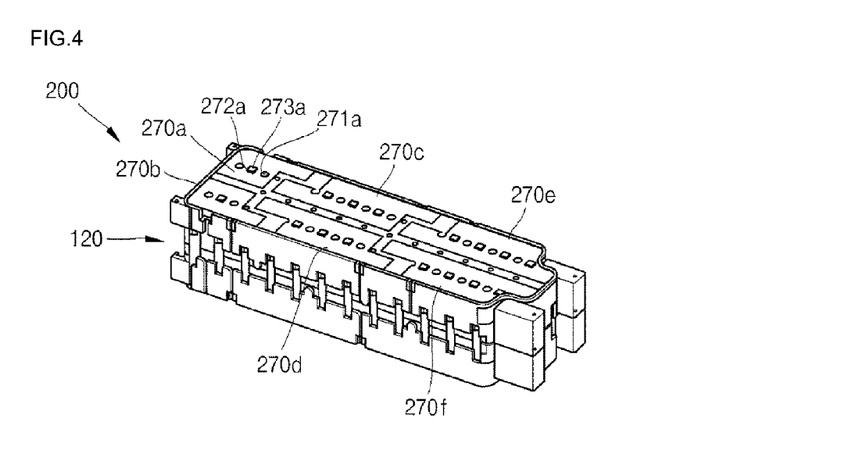
FIG. 4 is a perspective view illustrating a battery pack according to another embodiment of the present invention.

Next, another embodiment according to aspects of the present invention will be described in detail. FIG. 4 illustrates a battery pack 200 according to another embodiment of the present invention. In FIG. 4, parts having the same structure and operation as the embodiment illustrated in FIGS. 1-3 are denoted by the same reference numerals. Furthermore, parts having the same structure and operation as those illustrated in FIGS. 1-3 will be omitted in order to avoid redundancy. In the embodiment illustrated in FIG. 4, the first insulation structure has a different shape as compared to the first insulation structure described with reference to FIGS. 1-3. However, the remaining structure excluding the first insulation structure is the same as in the embodiment described with reference to FIGS. 1-3. Therefore, only the first insulation structure will be described in detail with reference to FIG. 4.

Referring to FIG. 4, a first insulation support structure of the battery pack 200 includes a plurality of first unit insulation members 270a, 270b, 270c, 270d, 270e, and 270f. The first unit insulation members 270a, 270b, 270c, 270d, 270e, and 270f are planar plates made of an insulation material. The first unit insulation members 270a, 270b, 270c, 270d, 270e, and 270f have a shape corresponding to the shape of the first unit connection members 150a, 150b, 150c, 150d, 150e, and 150f (illustrated in FIG. 2). The first unit insulation members 270a, 270b, 270c, 270d, 270e, and 270f are attached to the first corresponding unit connection members 150a, 150b, 150c, 150d, 150e, and 150f, for example, with adhesive or the like. As above, the first unit insulation members 270a, 270b, 270c, 270d, 270e, and 270f may be insulation tape.

Each of the first unit insulation members 270a, 270b, 270c, 270d, 270e, and 270f has a first coupling hole 271a, a first opening hole 272a, and a first cover 273a. Since the structures and operations of the first coupling hole 271a, the first opening hole 272a, and the first cover 273a are respectively the same as the structures and operations of the first coupling hole 171, the first opening hole 172, and the first cover 173 illustrated in FIG. 2, detailed descriptions thereof will be omitted herein. Since the first insulation support structure includes the first unit insulation members 270a, 270b, 270c, 270d, 270e, and 270f, a large battery pack is easily assembled.

While only the first insulation support structure is described above with reference to FIG. 4 as being made of a plurality of unit insulation members, it is understood that the second insulation support structure may also be made of a plurality of unit insulation members in some embodiments of the present invention. Furthermore, it is understood that in other embodiments, the first insulation support structure may be made of a planar plate, while the second insulation support structure is made of a plurality of unit insulation members.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack, comprising:
   a plurality of unit cells;
   a case having spaces that are sized for accommodating the plurality of unit cells and openings connected thereto and alignment openings;
   a first insulation structure covering a first external surface of the case; and
   a first connection structure positioned between the first external surface and the first insulation structure to connect electrode terminals of the plurality of unit cells to each other,
   wherein a plurality of first guide pins project from the first external surface of the case and wherein the plurality of guide pins extend into the alignment openings in the case and are flanged to extend over the spaces sized for accommodating the plurality of unit cells to inhibit the units cells from being separated from the case,
   and the first connection structure has a plurality of first insertion holes into which the first guide pins are respectively inserted and the first insulation structure has a plurality of first coupling holes into which the first guide pins are respectively inserted, so that the first guide pins are inserted into the alignment openings of the case, the first insertion holes of the first connection structure and the first coupling holes of the insulation structure simultaneously,
   wherein the case comprises a plurality of support columns supporting the plurality of unit cells and a plurality of passages formed in support columns,
   wherein the first connection structure has at least a plurality of first air vents corresponding to the passages,
   wherein the first insulation structure has at least a plurality of first opening holes distinct from the plurality of first coupling holes and from the openings connected to the spaces accommodating the plurality of unit cells that are positioned between the plurality of unit cells,
   wherein the passages, the first air vents and the first opening holes are connected to each other,
   and wherein the insulation structure includes a plurality of covers that cover the plurality of first opening holes and wherein the plurality of covers include openings to permit airflow through the first opening holes.

2. The battery pack as claimed in claim 1, wherein the case comprises a first frame wall protruding from an edge of the first external surface, and the first insulation structure has a shape corresponding to an internal region of the first frame wall.

3. The battery pack as claimed in claim 2, wherein the first insulation structure is closer to an interior of the case than an edge of the first frame wall.

4. The battery pack as claimed in claim 1, wherein the first insulation structure is attached to the first connection structure with an adhesive.

5. The battery pack as claimed in claim 1, wherein the first connection structure is coupled to the electrode terminals of the plurality of unit cells by welding.

6. The battery pack as claimed in claim 1, wherein:
   the first connection structure comprises a plurality of first unit connection members; and
   the first insulation structure comprises a plurality of first unit insulation members, such that shapes of the plurality of first unit insulation members respectively correspond to shapes of the plurality of first unit connection members.

7. The battery pack as claimed in claim 1, wherein the first insulation structure is a plate.

8. The battery pack as claimed in claim 1, wherein the first insulation structure comprises an insulation tape.

9. The battery pack as claimed in claim 1, further comprising:
   a second insulation structure covering a second external surface of the case, opposite to the first external surface of the case,
   wherein a plurality of second guide pins project from the second external surface of the case, and the second insulation structure has a plurality of second coupling holes into which the second guide pins are respectively inserted.

10. The battery pack as claimed in claim 9, further comprising:
    a second connection structure positioned between the second external surface and the second insulation structure to connect electrode terminals of the plurality of unit cells to each other,
    wherein the second connection structure has a plurality of second insertion holes into which the second guide pins are respectively inserted.

11. The battery pack as claimed in claim 9, wherein the second insulation structure has at least one second opening hole distinct from the plurality of second coupling holes.

12. The battery pack as claimed in claim 11, further comprising:
    a second connection structure positioned between the second external surface and the second insulation structure to connect the electrode terminals of the plurality of unit cells to each other,
    wherein the second connection structure has at least one second air vent corresponding to the at least one second opening hole.

13. The battery pack as claimed in claim 1, wherein the plurality of support columns have slits formed therethrough.

14. The battery pack as claimed in claim 1, wherein:
    the first connection structure comprises a plurality of first unit connection members; and
    the first insulation structure comprises a plurality of first unit insulation members, such that shapes of the plurality of first unit insulation members respectively correspond to shapes of the plurality of first unit connection members.

15. The battery pack as claimed in claim 10, further comprising:
    a first connection structure positioned between the first external surface and the first insulation structure to connect electrode terminals of the plurality of unit cells to each other, the first connection structure comprising a plurality of first unit connection members,
    wherein the first connection structure has a plurality of first insertion holes into which the first guide pins are respectively inserted,
    the first insulation structure comprises a plurality of first unit insulation members, such that shapes of the plurality of first unit insulation members respectively correspond to shapes of the first unit connection members,
    the second connection structure comprises a plurality of second unit connection members, and
    the second insulation structure comprises a plurality of second unit insulation members, such that shapes of the plurality of second unit insulation members respectively correspond to shapes of the plurality of second unit connection members.

16. The battery pack as claimed in claim 12, further comprising:

a first connection structure positioned between the first external surface and the first insulation structure to connect electrode terminals of the plurality of unit cells to each other, the first connection structure comprising a plurality of first unit connection members, wherein the first connection structure has a plurality of first insertion holes into which the first guide pins are respectively inserted, the first insulation structure comprises a plurality of first unit insulation members, such that shapes of the plurality of first unit insulation members respectively correspond to shapes of the first unit connection members, the second connection structure comprises a plurality of second unit connection members, and the second insulation structure comprises a plurality of second unit insulation members, such that shapes of the plurality of second unit insulation members respectively correspond to shapes of the plurality of second unit connection members.

17. The battery pack as claimed in claim 1, wherein the plurality of first guide pins respectively cover portions of corresponding openings of the first external surface to prevent the plurality of unit cells from being separated from the case.

* * * * *